United States Patent [19]

Washizuka et al.

[11] 4,158,230
[45] Jun. 12, 1979

[54] ELECTRONIC CALCULATOR WITH NO PROTRUDING KEY TOPS

[75] Inventors: Isamu Washizuka, Soraku; Shintaro Hashimoto, Shiki; Sadakatsu Hashimoto; Shigeki Komaki, both of Yamatokoriyama, all of Japan

[73] Assignee: Sharp Kabushiki Kaisha, Osaka, Japan

[21] Appl. No.: 843,047

[22] Filed: Oct. 17, 1977

[30] Foreign Application Priority Data

Oct. 15, 1976 [JP] Japan .................................. 51-124324

[51] Int. Cl.$^2$ .......................... G06F 15/02; H01H 9/00
[52] U.S. Cl. ........................................ 364/708; 200/5 A; 364/707; 364/709
[58] Field of Search ............... 364/705, 707, 708, 709; 200/5 A; 340/365 R

[56] References Cited

U.S. PATENT DOCUMENTS

| | | | |
|---|---|---|---|
| 3,627,927 | 12/1971 | Schmitz et al. | 200/5 A X |
| 3,732,389 | 5/1973 | Kaelin et al. | 200/5 A X |
| 3,955,355 | 5/1976 | Luce | 364/705 X |
| 3,995,126 | 11/1976 | Larson | 200/5 A |
| 4,035,593 | 7/1977 | Riniker | 200/5 A |
| 4,066,851 | 1/1978 | White et al. | 200/5 A |

*Primary Examiner*—Jerry Smith
*Attorney, Agent, or Firm*—Birch, Stewart, Kolasch & Birch

[57] ABSTRACT

The body of an electronic calculator comprising a keyboard, an arithmetic processor unit, a power supply and a digital display is accommodated within a casing at least a portion of which corresponding to the keyboard is made of a single flexible flat sheet such as cloth and leather. A plurality of limited regions of the flat sheet are given unique symbols and indicators corresponding to respective ones of keys of the keyboard by a printing technique for example, whereby the flexible flat sheet serving as manually operable key tops or actuators. When depressing a specific limited region of the key flat sheet, its associated elastomeric connector comes into contact with a comb shaped counter connector contact formed on a printed circuit board. Such an arrangement provides a keyboard with no protruding key tops for a totally new dimension in slimness and portability of calculators.

26 Claims, 14 Drawing Figures

ELECTRONIC CALCULATOR WITH NO PROTRUDING KEY TOPS

BACKGROUND OF THE INVENTION

The present invention relates to construction of an electronic calculator. In the sense of the present invention, an electronic calculator means, any electronic apparatus which is capable of performing an arithmetic operation in accordance with numeral and functional information introduced via a keyboard is included within the general field of the present invention and includes for example, a combined calculator and timekeeper, an electronic scale, an electronic price-calculating weight and the like. The following description sets forth details of the present invention in terms of only an electronic calculator.

DESCRIPTION OF THE PRIOR ART

It is well known in the art of an electronic calculator that each of the key switches of a keyboard is comprised on a combination of a key top, a spring and a pair of key contacts and the key top when depressed renders the key contacts closed to effect the switching performance. Each of the key tops has been adapted to protrude partially from a casing for a calculator. Another type of a keyboard using a resilient, electrically conductive, elastomeric member has been proposed in U.S. Pat. No. 3,699,294 dated Oct. 17, 1972 and assigned to Flex Key Corporation, wherein each of key tops has been arranged and positioned to protrude from a casing.

A power switch composed of a conventional slide switch protruded from the casing. The prior art calculators with such protruding key tops had a thicker profile in correspondence with the protrusions of the keyboards. This raised difficulties in accommodating the calculators when placed into the operator's shirt pocket. In addition, because the respective key tops protruded from the casing of the calculator, the power switch would be inadvertently thrown when the calculator was within the operator's pocket. Springs employed for the power switch and the key switches would be subject to stress during long periods of operation.

SUMMARY OF THE INVENTION

Accordingly, it is an object of the present invention to provide an extremely thin electronic calculator with no protruding key tops.

It is another object of the present invention to provide an electronic calculator having no particular power switch wherein a specific key of a keyboard is adapted to serve also as a power switch.

In accordance with the present invention, there is provided an electronic calculator of which primary components such as a keyboard, an arithmetic processor unit, a power supply and a digital display are housed within a casing. At least a portion of the casing along with the keyboard is made of a single flexible flat sheet such as cloth and leather. It is preferable that urethane resin on non-woven fabric or woven fabric, vinyl chloride on non-woven fabric or woven fabric, nylon on non-woven fabric or woven fabric and the like be used as such flexible key flat sheet. A plurality of limited regions the flat sheet are given unique numerals, symbols and indicators to correspond to respective ones of key switches by for example, a printing technique. The flexible flat sheet serves as manually operable key tops or actuators. A rubber sheet having resilient, electrically conductive elastomeric movable contacts registable with the respective limited regions of the key top flat sheet is positioned beneath the key top flat sheet. When depressing a specific limited region of the key top flat sheet, its associated elastomeric contact comes into contact with a comb-configured contact formed on a printed circuit board.

The above listed materials have advantageous features over the prior art keyboard as disclosed in the above referenced patent: firstly, the key top flat sheet will not get dirty by the operator's depression during a long period of operation; secondly, it is easy to print the symbols and indicators on the surface of the key top flat sheet and print them in different colors; and finally the key top flat sheet can be easily and quickly separated from the operator's finger upon release of pressure.

In one preferred form, a specific key within the keyboard can be adapted to serve as a power switch for an electronic calculator. In this instance, that specific key should have a recession positioned below the key top flat sheet. In the event that any keys are not manually operated for a given period of time, the power control will cease supplying power to the arithmetic processor unit. The absence of the power switch needs this power supply control.

BRIEF DESCRIPTION OF THE DRAWINGS

Other objects and novel features of the present invention are set forth in the appended claims and the present invention as to its organization and its mode of operation will best be understood from a consideration of the following detailed description of the preferred embodiments taken in connection with accompanying drawings, wherein:

DETAILED DESCRIPTION OF THE INVENTION

Figures 1A, 1B, 1C:
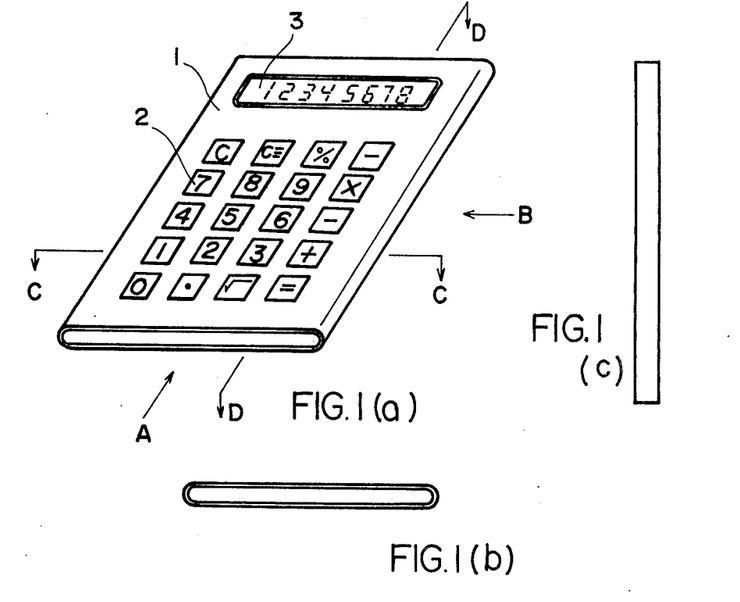
FIGS. 1(a), 1(b) and 1(c) are a perspective view and side views of one preferred form of an electronic calculator embodying the present invention.

Referring now to FIG. 1(a), one preferred form of an electronic calculator embodying the present invention is illustrated wherein the above described flexible key sheet 1 is secured on a casing 6 for the calculator. By way of example, urethane resin on non-woven fabric is employed as the key top flat sheet. A plurality of limited regions of the key top flat sheet are given unique numerals, symbols and indicators 2 such as [0], [1], [2], [X], [÷], [M+], [%], [CE], etc., to correspond to respective ones of key switches. The formation of the respective symbols and indicators can be accomplished by a conventional printing technique or an embroidery technique. A digital display 3 such as an eight-digit liquid crystal display is provided for displaying results of arithmetic operations. FIG. 1(b) shows a side view of the calculator taken along the direction A while FIG. 1(c) shows a side view taken along the direction B. It is obvious from FIGS. 1(a), 1(b) and 1(c) that any components or parts do not protrude from the body or the casing 6 of the calculator.

Figure 2:
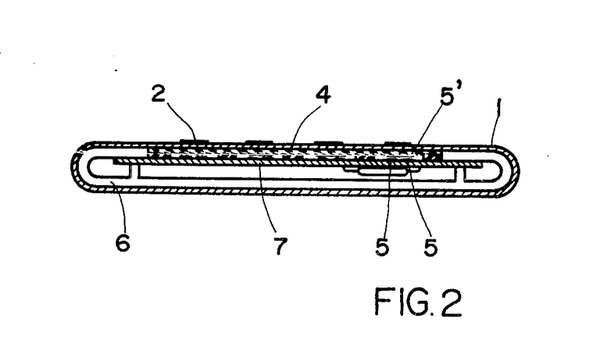
FIGS. 2 through 4 are cross-sectional views of the calculator as shown in FIGS. 1(a), 1(b) and 1(c)

FIG. 2 is a cross sectional view of the electric calculator taken along the line C—C of FIG. 1(a). Key switching performance is carried out when a specific key contact 5' formed on a rubber sheet 4 comes into contact with a comb-configured key contact 5 formed on a printed circuit board 7. These key components are kept within the casing 6. As noted earlier, the flexible key top flat sheet 1 which carries the symbols and indicator 2 is positioned above the pair of the key contacts.

Figure 3:
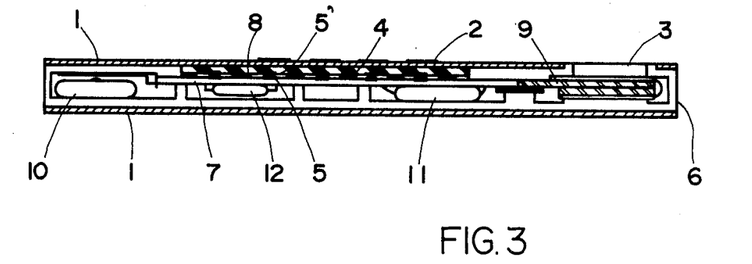

FIG. 3 illustrates a cross sectional view of the calculator taken along the line D—D wherein the liquid crystal display is denoted as 3 and a silver battery is denoted as 10. Construction of the key switches will be discussed in more detail. The rubber sheet 4 is made of for example silicon rubber or chloroprene rubber and provided with a plurality of elastomeric contact members 5' registable with the respective ones of the key top regions. The elastomeric contact members 5' are made by adding carbon particles to the rubber sheet 4. A spacer 8 is provided to keep the rubber sheet 4 a predetermined distance from a printed circuit board 7. The spacer 8 may be polyester, polyethylene or polypropylene. An arithmetic processor unit 11 is implemented with a LSI semiconductor chip. Other electronic components are denoted as 12. A plurality of comb-configured key contacts 5 are formed on the printed circuit board to confront against the respective moving elastomeric contact members 5'. The moving elastometic contact member 5' and the comb-configured key contact 5 in combination form a single key switch. Since as discussed previously the key symbols or indicators 2 serve the functions of the prior art protruding key tops, the whole of the calculator is made much thinner.

Figure 4:
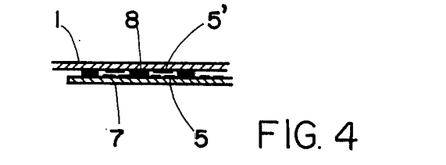
Figure 5:
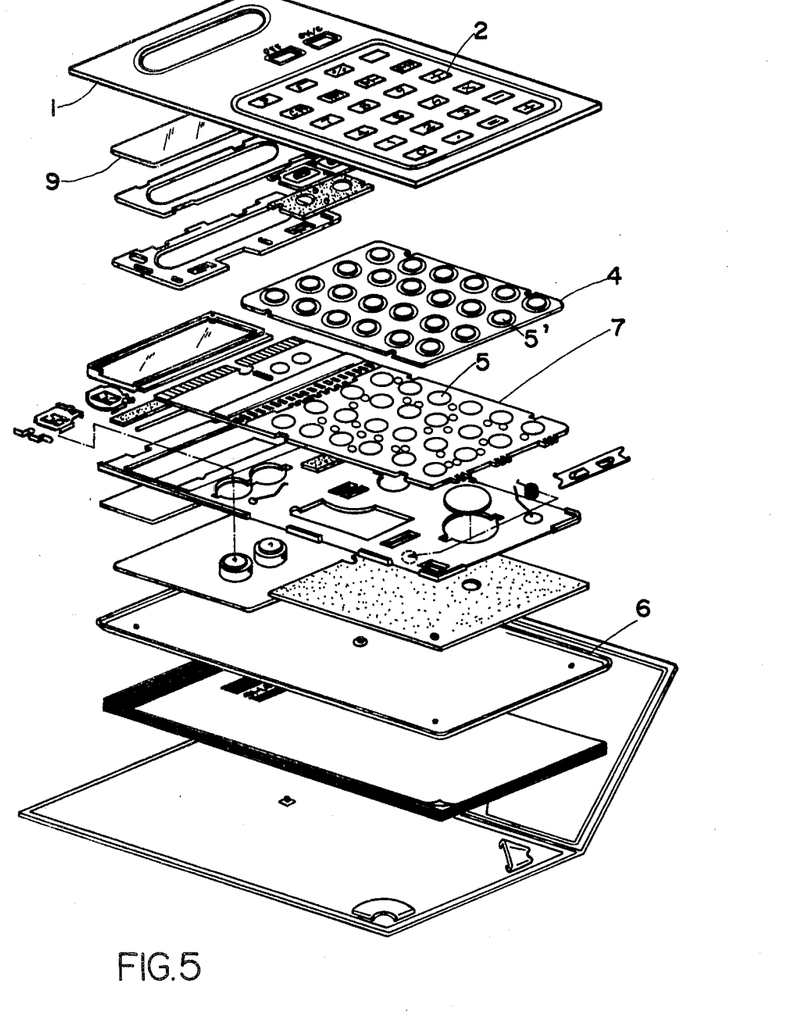
FIG. 5 is an exploded perspective view of the calculator.

In this manner, the electronic calculator embodying the present invention utilizes successful flexibility and a planar form of the flexible flat sheet 1 which partially covers the body of the calculator. Details of the keyboard will be covers more understandable by reference to an enlarged cross sectional view shown in FIG. 4 and an exploded perspective view shown in FIG. 5.

The power supply should be properly controlled because the thin-profile calculator does not need a particular power switch. That is to say, in the event that any key top is not manually operated during a given period of time, a power supply control will cease supplying power to the arithmetic processor unit. To this end the power control employs a CMOS circuit construction with extremely low power consumption instead of a switch having a pair of mechanical contacts.

Figure 6:
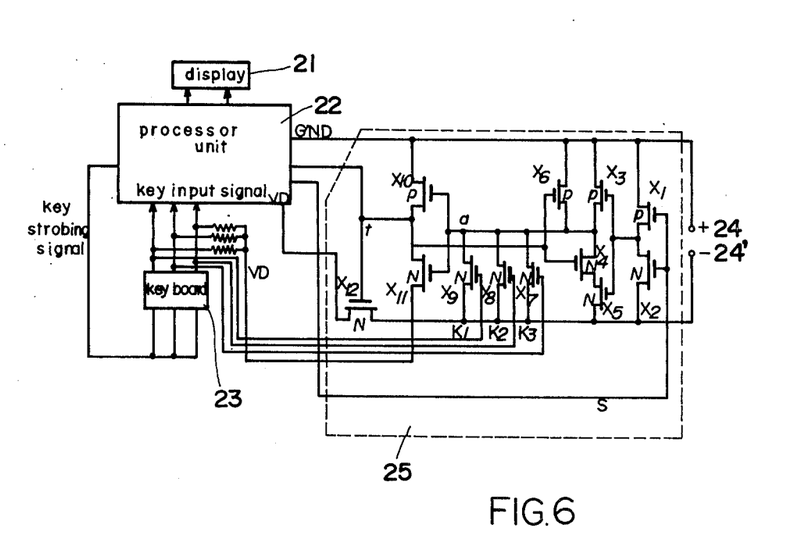
FIGS. 6 through 10 are circuit diagrams of a power supply control for the calculator as shown in FIGS. 1 through 5.

FIG. 6 illustrates a circuit diagram of the power supply control used with the present invention, wherein the display is denoted as 21, the arithmetic processor unit is denoted as 22, the keyboard is denoted as 23, a power supply such as one or more silver batteries is denoted as 24 and a power supply control circuit is denoted as 25. The power supply control circuit 25 comprises P channel or N channel MOS field effect transistors $X_1$ through $X_{12}$. Various signals occurring within the power supply control circuit 25 are denoted as a, b, s, t, $k_1$, $k_2$ and $k_3$.

Figure 7:
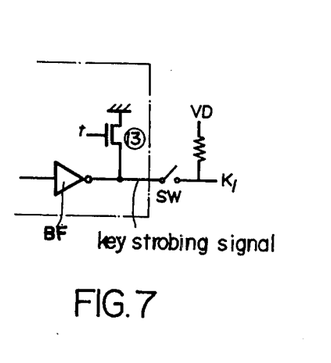

FIG. 7 illustrates a circuit diagram of a key input circuit which comprises a buffer BF, a P channel transistor $X_{13}$ and the key switch SW of the keyboard as previously discussed. One terminal of the key switch SW is conventionally supplied with a key strobing signal. With such an arrangement, when the power 24, 24' is supplied to the processor unit 22, the signal t is at a potential -V. Because the p channel transistor $X_{13}$ is turned on at this time, the key strobing signal terminal is at the zero potential. If the key switch SW is in the on state, the output signal $K_1$ stands at the zero potential.

Figure 8:
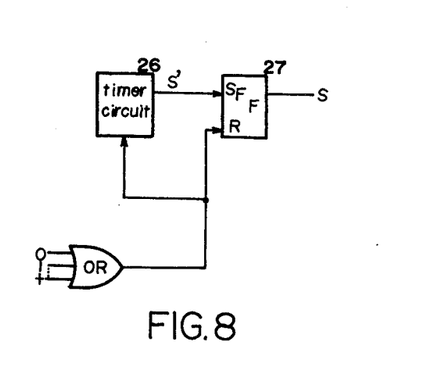

FIG. 8 shows a generator for providing a power control signal S, which is set up by a timer circuit 26, an R-S flip-flop 27 and an OR gate OG. An input to the OR gate OG is coupled with an output signal from the key switch SW. When the power source 24, 24' is on, supplying the processor unit 22 with power energy, depression of the key switch will cause the R-S flip flop 27 and the timer circuit 26 to be reset. When this occurs, the output signal S of the R-S flip flop 27 stands at the potential -V.

If any key switch is not operated during a give period of time, the timer circuit 26 will develop a signal S' available for setting the R-S flip-flop 27. The power control signal S assumes the zero potential. As described later, the potential S will cause the power being supplied to the processor unit 22 to cease. The timer circuit 26 may be implemented with any conventional technique for example a CR delay circuit and a counter. Of course, the timer circuit 26 is previously settable or learnable.

Figure 9:
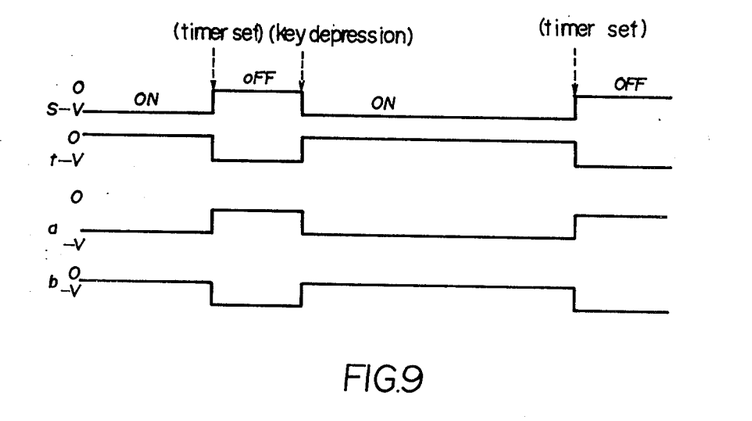

FIG. 9 depicts a relationship among the various signals s, t, a and b and thus a relationship among the various events such as on and off of the power supply to the processor unit 22, setting of the timer circuit 26 and depression of the key switch SW.

A mode of operation of the above discussed power supply control will be set forth in the following manner with reference to FIG. 6.

Assume now that the power source 24, 24' supplies the processor unit 22 with power and the key switch is being manually operated. If any key switch has not yet been operated for the given period of time, the power control signal S is changed from the -V potential to the zero potential through the function of the generator of FIG. 8. This causes the output signal to assume the zero potential and the N channel transistor $X_{11}$ to be turned on. The output signal of the transistor $X_{11}$ is decreased to the -V potential to render the N channel transistor 12 non-conductive. This results in the power source 24, 24' to cease supplying the processor unit 22 and the display 21 with power. Under the condition that power supply from the power source 24, 24' is inhibited, the signal t is at the -V potential so that the P channel transistor $X_6$ and then the N channel transistor $X_{11}$ are turned on. Thus, the N channel transistor $X_{12}$ is kept in the off state. The power source 24, 24' goes on to cease supplying the processor unit 22 with power.

If any key switch is operated under the condition that the processor unit 22 is not supplied with power, the circuit of FIG. 7 becomes operable to transmit the key signal $K_1$ into the N channel transistor $X_9$ thereby turning on the transistor $X_9$. The output a of the transistor $X_9$, therefore, is decreased to the -V potential to turn on the P channel transistor $X_{10}$. The output signal t of the transistor $X_{10}$ is increased to the zero potential which in turns renders the N channel transistor $X_{12}$ conductive. The transistor $X_{12}$ in the on state allows the power source 24, 24' to start supplying the processor unit 22 and the display 21 with power. Since the power control signal S is at the -V potential while the key switch is being operated, the P channel transistor $X_1$ is turned on to provide the output signal b thereof at the zero potential. The signal b renders the N channel transistor $X_5$ non-conductive. At this time the N channel transistor $X_4$ is in the on state the signal a is at the -V potential because of the signal t assuming the zero potential. Consequently, the P channel transistor $X_{12}$ is kept in the on state. In other words, the power source 24, 24' continues supplying the processor unit 22 and the display 21.

As stated above, in the event that depression of any key switch has not been detected during the given period of time, the timer circuit 26 of FIG. 8 develops the signal S' to terminate power supply to the processor unit 22.

In this manner, the power supply control circuit 25 with no mechanical switches used with the present invention makes it possible to control power supply to the processor unit 22 upon development of the control signal S responsive to key operation. Since the power control circuit 25 is implemented with a CMOS semiconductor chip, no direct current flows and circuit performances are carried out in the static manner. Therefore, only leak current can be evaluated and power consumption incurred within the power control circuit 25 is almost negligible. Although circuit implementation can be effected with other than the CMOS chip, circuit implementation consisting of only P channel transistors for example would in fact increase power consumption.

The power supply control used with the present invention allows the key switch to serve also as a power switch and therefore eliminate necessity of the prior art power slide switch.

Nevertheless, in the illustrated example the function of supplying the processor unit with power is accomplished by any of the keys within the keyboard. In this instance circuit implementation is complicated and entry of keyed information is time-consuming. This is because the LSI chip is cleaned and then loaded with keyed information. If the key switch is operated only for an extremely short period of time, the LSI chip will not be able to store the keyed information.

Figure 10:
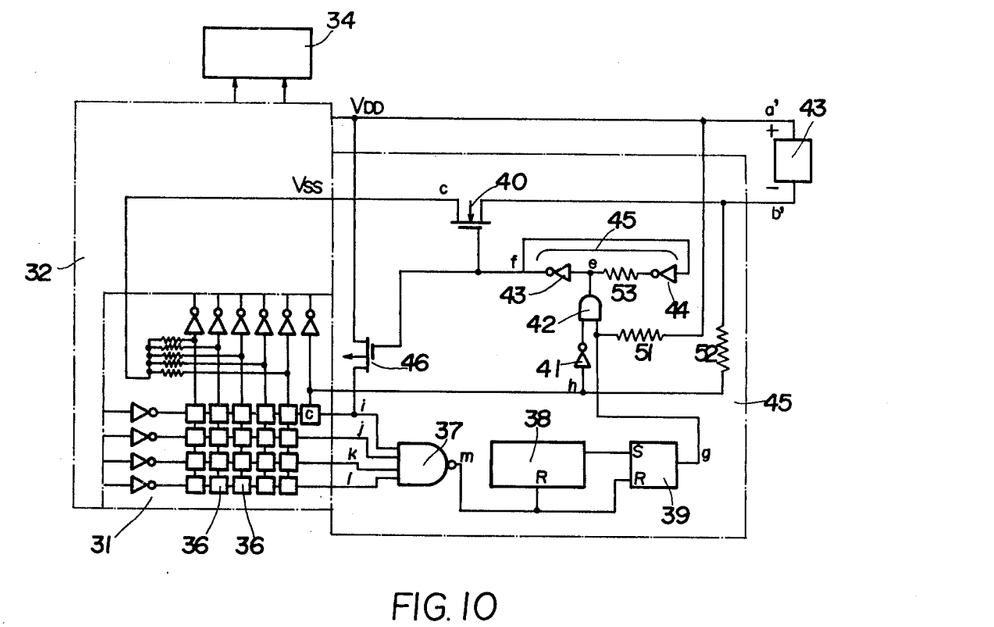

It is therefore concluded that a clear key is also available for controlling the power supply. FIG. 10 shows a circuit diagram of a power supply control circuit responsive to depression of the clear key. An electronic calculator in this modification comprises similarly a keyboard 31, an arithmetic processor unit 32, a power source 33, a digital display 34 and a power supply control 25. As obvious to those skilled, the keyboard 31 includes numeral keys, function keys and a clear key C and outputs via the respective keys are introduced into the processor unit 32. Strobing signal outputs i, j, k and l are coupled with a gate 37. The strobing signals are four phase different pulse signals derived from the processor unit 32. The output m of the gate 37 is coupled with a reset terminal of a counter 38 and a reset terminal of an R-S flip-flop 39.

The output of the counter 38 is coupled with a reset terminal of the R-S flip-flop 39. The output of the R-S flip-flop 39 is denoted as g. The power source 33 has a positive potential a' and a negative potential b'. The positive potential a' is supplied to a positive power source $V_{DD}$ of the processor unit 32 and the output g of the flip-flop via a resistor $R_1$, while the negative potential b' is supplied to a line for a key input signal h from the clear key C via resistor 52 and to drain of an N channel transistor 41. A source of the N channel transistor 40 is connected to a negative power source $V_{SS}$ of the processor unit 32. While the key input signal h from the clear key C is applied to an inverter 41, the output of the inverter 41 and the output g of the flip-flop 39 are applied to a gate 42.

The output e of the gate 42 is applied to a flip-flop 45 comprising an inverter 43, a resistor 53 and an inverter 44. The output f of the flip-flop 45 is applied to the gate of the N channel transistor 46 of which the drain is connected to the positive source $V_{DD}$ of the processor unit 32 and the source is connected to a terminal leading the strobing signal i for the clear key C. It will be noted that the inverter 41, 43, 44 and the gate 42 are connected to the negative potential $V_{SS}$ at the node b' and the remaining circuits, that is, the gate 37, the counter 38 and the flip-flop 39 are also connected to the negative potential $V_{SS}$ at the node C.

When the output f of the flip-flop 45 is at a low level, the N channel transistor 40 is non-conducting with the node C at a high level. The P channel transistor 46 is in the on state with its source i at the $V_{DD}$ level or the high level. The key input signal n from the clear key C applied to a' of the power source 33 via the resistor 52 is at the low level.

Since the source voltage $V_{DD}$ and C supplied to the R-S flip-flop 39 is at the high level, the output g of the R-S flip-flop 39 never be at the low level and thus does assume the high level because it is connected to a' via the resistor 51. This means that the one input terminal g of the gate 42 is at the high level and the other input terminal e of the gate 42 is at the high level. As a result, the output terminal f of the flip-flop 45 is held at the low level and the N channel transistor 40 is held in the off state.

Assume now that the clear key C is operated under these circumstances. The lines i and h are connected to each other and h is at the high level and current flows via the resistor 52 into b' of the power source 33 because the source of the P channel transistor 46 is at the high level. Therefore, the output e of the gate 42 falls to the low level and the flip-flop 45 is changed with the output f of the high level. As soon as the N channel transistor 40 is changed into the on state the P channel transistor 46 is changed into the off state with h falling again to the low level.

The output m of the gate 37 is at the high level and the flip-flop 39 is reset with its output g at the low level. The input e to the flip-flop 45 is held on at the low level with its output f at the high level. The N channel transistor 40 is turned on.

The source C of the N channel transistor 40 is at the low level and the negative power source $V_{SS}$ of the processor unit 32 assumes the same negative potential as in the power source 32, thereby the CMOS LSI semiconductor chip starts operating. Simultaneously, the counter 38 also starts counting pulses and, when a given number of pulses are reached, provides the set signal for the flip-flop 39 of which the output g is at the high level. Since h has already been at the low level, the output e of the gate 42 is at the high level and the output f of the flip-flop 45 is at the low level. Then, power supply to the processor unit 40 in the off state.

While the LSI processor unit is operating, the key outputs i, j, k and l are normally at the high level. However, the output m of the gate 37 at the low level, does not influence the counter 38 or the flip-flop 39. If any key is depressed, then the key strobing signal appears on its associated key output line so that the output m of the gate 37 is changed to reset the counter 38 and the flip-flop 39 on the way that the output m is increased to the high level. Therefore, the counter 38 is cleaned upon every depression of the keys.

Even if any function key other than the clear key C is depressed, neither the input h of the inverter 41 nor the output f of the flip-flop 45 assume the high level since the channel transistor 40 is in the off state. It will not be able to turn on the P channel transistor 40.

Thus, depression of any function key never initiates supplying of power to the processor unit 32. Only by depressing the clear key is the power supply changed from the off state to the on state.

Why the key, available for controlling power supply is limited to the clear key is due to the fact that when using the calculator the operator should first operate the clear key and then select the numeral keys.

It is obvious to those skilled that while the power supply control can be implemented with EC-MOS semiconductor chip, C-MOS semiconductor chip, etc., power consumption is negligible in case of the C-MOS implementation as set forth above.

Meanwhile, in the design of electronic calculators an automatic clear circuit is required to clear registers, flip-flop, etc., upon power throw. However, according to the embodiment disclosed in FIG. 10 the clear key to be first operated starts power supply to the processor unit and the display and simultaneously clears the registers and the like. Therefore, the embodiment of FIG. 10 does not need such an automatic clear circuit.

Although the embodiment of FIG. 10 has been discussed in terms of the single clear key C in case of a one or more memory-equipped calculator having a memory clear key CM, the arithmetic processor unit and the display may be supplied only when the clear key C and the memory clear key CM are operated in succession or at the same time. Since in this case power is not thrown unless the two keys are operated, there is a remarkably reduced possibility that power will be inadvertently thrown when a foreigner strikes the clear keys.

Figures 11A, 11B:
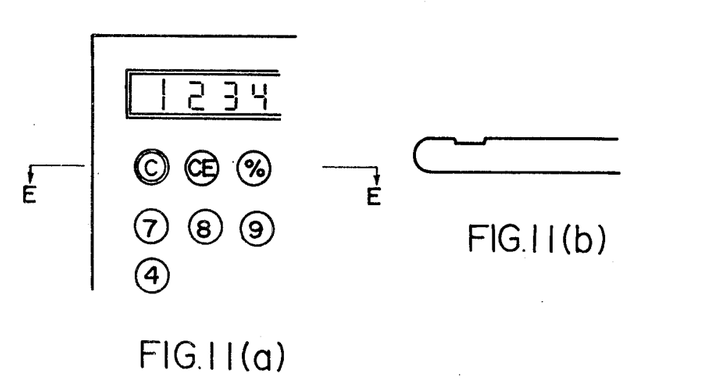
FIGS. 11(a) and 11(b) are a partial plan view and a side view of another preferred form of an electronic calculator according to the present invention.

It is recommended in case of utilizing the clear key C for controlling power supply as set forth above that the clear key C is positioned somewhat below the plane including the flexible key top sheet. FIGS. 11(a) shows a top view of a keyboard panel including the recessed clear key C while FIG. 11(b) shows a cross sectional view taken along the line E—E of FIG. 11(a). With such an arrangement, since the clear key C is a well known touch key, power supply can be suppressed even when the operator's finger comes undesirably into contact with the clear key C. When the calculator is inserted into the operator's shirt pocket after performing calculations, power will not be thrown by mistake.

While only certain embodiments of the present invention have been described, it will be apparent to those skilled in the art that various changes and modifications may be made therein without departing from the spirit and scope of the invention as claimed.

What is claimed is:

1. An electronic calculator having a keyboard, with keys thereon, an arithmetic processor unit, a power supply and a digital display; said electronic calculator comprising in combination:
    a casing means for accommodating said keyboard, said arithmetic processor unit, said power supply and said digital display;
    wherein said casing corresponding to said keyboard comprises a single flexible flat sheet;
    wherein a plurality of limited regions of said flat sheet are identified by unique symbols or indicators corresponding to respective ones of said keys of said keyboard, whereby said flexible flat sheet further comprises manually operable flat top key tops or key switch actuators;
    a plurality of pairs of key contacts adjacent to respective ones of said manually operable flat top key switch actuators in the provision of a like plurality of key switches;
    means responsive to actuation of said key switches for generating a key switch output signal;
    means responsive to said key switch output signal, for generating a power control signal;
    means responsive to said power control signal, for supplying power to said processor unit;
    means responsive to the absence of key switch actuation, for nullifying said power control signal; and
    means responsive to the absence of a power control signal for shutting off said supply of power to said processor unit.

2. The electronic calculator as set forth in claim 1 wherein said flexible flat sheet comprises cloth or leather.

3. The electronic calculator as set forth in claim 2 wherein said flexible flat sheet comprises urethane resin on non-woven fabric.

4. The electronic calculator as set forth in claim 2 wherein said flexible flat sheet comprises vinyl chloride on non-woven fabric.

5. The electronic calculator as set forth in claim 2 wherein said flexible flat sheet comprises nylon on non-woven fabric.

6. The electronic calculator as set forth in claim 1 wherein said symbols or indicators are printed on said limited regions of said flexible flat sheet.

7. An electronic calculator as set forth in claim 1 wherein said means responsive to actuation of said key switches for generating an output signal comprises:
    a p-channel transistor;
    a buffer; and
    a key switch;
    said buffer and said key switch being joined at a junction;
    said transistor being grounded on one side and connected to said junction of said buffer and said key switch on the other; and
    said key switch output signal being generated when said key switch is activated and said transistor is concurrently in a saturated state.

8. An electronic calculator as set forth in claim 7 wherein said means responsive to said output signal for generating a power control signal comprises an OR gate having inputs and an output, said OR gate responsive to said key switch output signal at its input, to generate an output; and
    a set reset flip-flop means, having set and reset inputs, responsive to said output of said OR gate at its said reset input, for generating said power control signal.

9. An electronic calculator as set forth in claim 8 wherein said means responsive to the absence of key switch actuation for nullifying said power control signal comprises:
    a timing circuit means having an input and an output for generating an output after a specific time period has elapsed since the last key switch was depressed;

said timing circuit means having its input responsive to said output of said OR gate and having its output driving a set input of said set reset flip-flop means.

10. An electronic calculator as set forth in claim 1 wherein said means responsive to said power control signal, for supplying power to said processor unit, comprises:
a combination of transistors so interconnected as to short circuit a main power supply line to said processor unit in response to the presence of said power control signal.

11. An electronic calculator as set forth in claim 1 wherein said means responsive to the absence of a power control signal, for shutting off said supply of power to said processor unit, comprises:
a combination of transistors so interconnected as to open circuit a main power supply line to said processor unit in response to the absence of said power control signal.

12. An electronic calculator having a keyboard, with keys thereon, an arithmetic processor unit, a power supply and a digital display; said electronic calculator comprising in combination:
a casing means for accommodating said keyboard, said arithmetic process unit, said power supply and said digital display;
wherein said casing corresponding to said keyboard comprises a single flexible flat sheet;
wherein a plurality of limited regions of said flat sheet are identified by unique symbols or indicators corresponding to respective ones of said keys of said keyboard, whereby said flexible flat sheet further comprises manually operable flat top key switch actuators;
a plurality of resilient, electrically conductive elastomeric moving contact members attached to the respective ones of said manually operable flat top key switch actuators in the provision of a like plurality of key switches;
electrically conductive fixed contact members adjacent to and registable with said key switches each further including corresponding ones of said resilient, electrically conductive elastomeric moving contact members and manually operable flat top key switch actuators;
means responsive to actuation of said key switches for generating a power control signal;
means responsive to said power control signal for supplying power to said processor unit; and
means, responsive to the absence of key-switch actuation, for shutting off power to said processor unit.

13. The electronic calculator as set forth in claim 12 wherein said plurality of resilient, electrically conductive elastomeric moving contact members are formed on a rubber sheet.

14. The electronic calculator as set forth in claim 13 wherein said rubber sheet comprises silicon rubber.

15. The electronic calculator as set forth in claim 13 wherein said rubber sheet comprises chloroprene rubber.

16. The electronic calculator as set forth in claim 12 wherein said plurality of electrically conductive fixed contact members are formed on a printed circuit board carrying said arithmetic processor unit and said digital display.

17. The electronic calculator as set forth in claim 12 further comprising a spacer film means for separating said plurality of moving contact members from said plurality of electrically conductive fixed contact members.

18. An electronic calculator as set forth in claim 12 wherein said means responsive to actuation of said key switches, for generating a power control signal comprises:
a p-channel transistor;
a buffer; and
a key switch;
said buffer and said key switch being joined at a junction;
said transistor being grounded on one side and connected to said junction of said buffer and said key switch on the other; and
said key switch output signal being generated when said key switch is activated in response to the saturation of said transistor;
an OR gate having inputs and an output, said OR gate responsive to said key switch output signal at its input, to generate an output of said key switch on one end and to a reset input of a flip-flop on the other; and
a set-reset flip-flop means, having set and reset inputs responsive to said output of said OR gate at said reset input for generating said power control signal.

19. An electronic calculator as set forth in claim 18 wherein said means, responsive to said power control signal, for supplying power to said processor unit, comprises:
a combination of transistors so interconnected as to short circuit a main power supply line to said processor unit in response to the presence of said power control signal.

20. An electronic calculator as set forth in claim 19 wherein said means responsive to the absence of key switch actuation, for shutting off power to processor unit, comprises:
a timing circuit means having an input and an output for generating an output after a specific time period has elapsed since the last key switch was depressed;
said timing circuit means having its input connected to said output of said OR gate and having its output driving a set input of said set-reset flip-flop means;
said set-reset flip-flop means being responsive to said output from said timing circuit, for nullifying said power control signal; and
a combination of transistors so interconnected as to open circuit a main power supply line to said processor unit in response to the absence of said power control signal.

21. A keyboard of an electronic calculator comprising:
a casing means for accommodating components of said electronic calculator;
wherein at least a portion of said casing corresponding to said keyboard comprises a single flexible flat sheet;
wherein a plurality of limited regions of said flat sheet are identified by unique symbols or indicators corresponding to respective ones of said keys of said keyboard, wherein said flexible flat sheet further comprises manually operable flat top key switch actuators; and
a plurality of pairs of key contacts adjacent to respective ones of said manually operable flat top key switch actuators;

said manually operable flat top key switch actuators including a power supply control switch means for turning on said calculator upon initial use;

said power supply control switch means comprising any one of the numeric or function keys on said keyboard; and said keyboard further including means for automatically turning off said calculator when not is use.

22. The keyboard of an electronic calculator as set forth in claim 21 wherein depression of said power supply control switch means causes electrical power to flow to an arithmetic processor unit within said electronic calculator.

23. The keyboard of an electronic calculator as set forth in claim 22 wherein said means for automatically turning off said calculator when not in use comprises a timing circuit means for automatically sensing the supply of electrical power to said arithmetic processor unit when a given period of time has elapsed after depression of any keys of said keyboard.

24. A keyboard of an electronic calculator in accordance with claim 21 wherein said power supply control switch means comprises a clear key.

25. A data processor apparatus with a keyboard comprising:
- a flat keyboard means comprising:
  - a plurality of digit and function keys wherein each key comprises a pair of contact means and a non-protruding key actuator, said key actuator providing means for forcing said pair of contact means into engaging relationship when said key is being depressed;
  - a power supply control switch means further comprising a pair of contact means and a non-protruding key actuator, said actuator providing means for forcing said pair of contact means into engaging relationship when said key is being depressed in the provision of a power supply control switch of the self-restoring type which is identical to the other individual keys on the flat keyboard means; and
- a generator means for providing a power control signal output responsive to said self-restoring type power supply control switch and holding said power control signal output after the release of said actuated power supply control switch to control the supply of power to said processor apparatus.

26. A data processor apparatus with a keyboard comprising:
- a flat keyboard means having a plurality of digit and function keys each key including a pair of contact means and a non-protruding key actuator for forcing the said pair of contact means into engagement when a said key is being depressed;
- a power supply control switch included within said flat keyboard means also having a pair of contact means and a non-protruding key actuator forcing the pair of contact means into engagement in response to actuation of said power supply control switch, thereby providing a power supply control switch of the self-restoring type in the form of the individual digit and function keys in the flat keyboard means; and
- a latch means responsive to said self-restoring type power supply control switch and holding its condition after the release of the actuated power supply control switch to provide a power supply control signal for controlling the supply of power to said processor apparatus.

* * * * *